Oct. 21, 1958     D. C. PROBST ET AL     2,856,983
EASY ENTRANCE SEAT

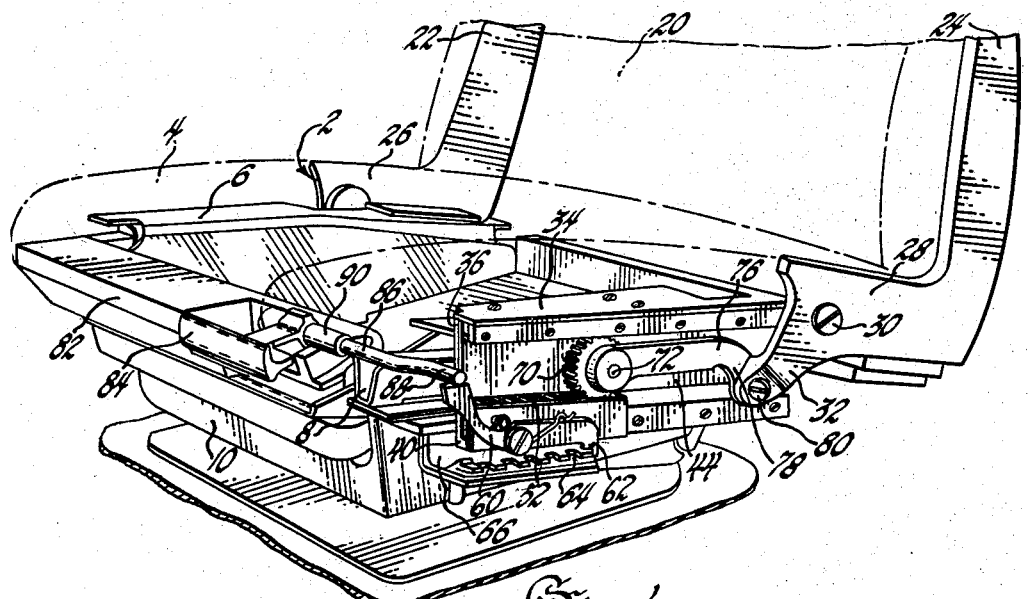

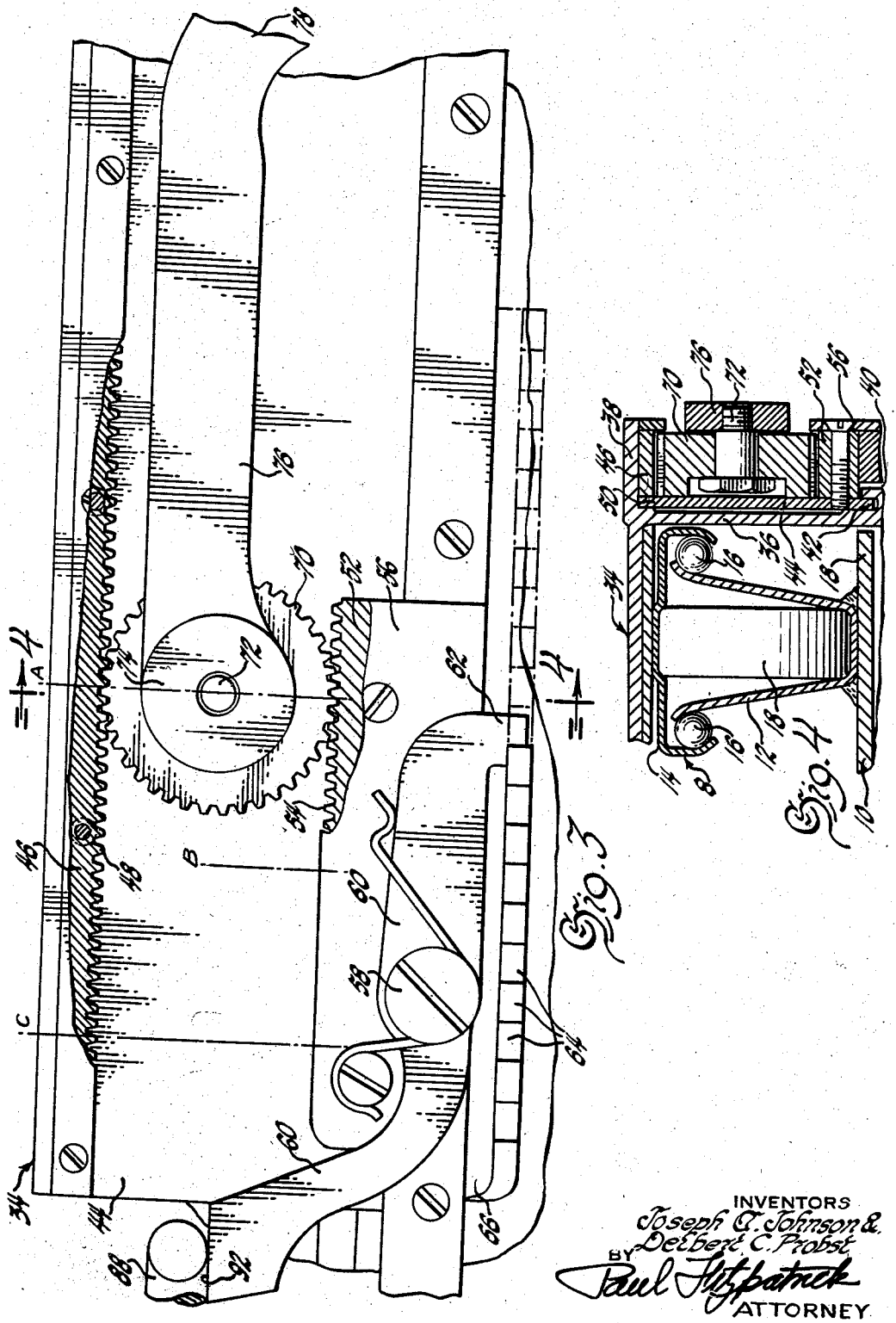

Filed Feb. 10, 1955     3 Sheets-Sheet 3

INVENTORS
Joseph O. Johnson &
Delbert C. Probst
BY Paul Fitzpatrick
ATTORNEY

United States Patent Office 2,856,983
Patented Oct. 21, 1958

2,856,983

EASY ENTRANCE SEAT

Delbert C. Probst, Detroit, and Joseph A. Johnson, Royal Oak, Mich., assignors to General Motors Corporation, Detroit, Mich., a corporation of Delaware Application February 10, 1955, Serial No. 487,396

19 Claims. (Cl. 155—14)

This invention relates to vehicle seats of the type having forwardly tiltable seat backs, and more particularly to front seats having seat back responsive actuating mechanism effective to temporarily displace the seat forwardly from a normal occupied position to provide additional clearance for access to the rear vehicle seat.

Seat actuating mechanisms operated by tilting the seat back are well known in the prior art. Almost without exception, such seats utilize the basic lever action of the tilting back to effect forward displacement of the seat. In the typical installation, one of the upwardly extending laterally spaced hinge arms connecting the seat back to the seat is provided with an integral projection forming a relatively short downwardly extending lever arm which is movable about the seat back pivot axis in an angular path opposite that of the seat back. A fixed stop or lug is mounted in a suitable location on the vehicle floor to intersect the angular path of movement of the short lever arm. When the seat back is tilted forwardly, the depending lever arm swings rearwardly until the motion thereof is arrested by the stop. Thereafter continued forward swinging movement of the seat back requires that the pivotal connection between the seat and seat back move progressively forward in order to permit further rearward angular movement of the short lever arm. Since the pivotal connection is fixed rigidly with respect to the seat, it follows that the seat will be forwardly displaced a distance approximately equal to the angular distance traveled by the depending projection. While this arrangement has proven highly effective for seat displacement of moderate extent, serious difficulties are presented when it is desired to provide fore and aft seat displacement of considerably greater magnitude. Although, as stated previously, forward seat displacement will be roughly equal to the arcuate path traveled by the depending projection on the seat back arm, it will be evident that an increase in length of the arcuate path of the lever requires proportional increase in length of the lever. However, increased fore and aft range of actuation accomplished by increased length of the depending projection is limited strictly by the height limitations on the seat structure. To overcome this difficulty, it has already been proposed to suitably lengthen the downwardly projecting arm and to provide a pocket or well in the vehicle floor which will accommodate the increase in length and thus permit retention of a relatively low seat level. However, seats of this type present serious engineering difficulties and design interferences, particularly in modern motor vehicles in which clearance between the vehicle floor and the road is very often already at or near the minimum permissible limit.

An object of the present invention is to provide a seat back responsive fore and aft seat actuating mechanism of exceptionally shallow depth requirements.

Another object is to provide a seat back responsive fore and aft seat actuating mechanism of exceptionally shallow depth requirements wherein the effective lever ratio of the seat back is multiplied to provide greatly increased fore and aft movement of the seat without increasing the angular range of movement of the seat back.

A further object is to provide a movably mounted seat cushion structure having a tiltable seat back pivotally secured thereto, the seat back having a rigid lever arm connected thereto, there being a mechanism interposed between one end of the lever arm and the seat structure which is effective to cause progressive forward linear actuation of the seat simultaneous with forward tilting movement of the seat back.

Still another object is to provide a seat actuating mechanism of the type referred to which provides a range of linear seat actuation equal to approximately twice the length of the downwardly projecting lever arm associated with the seat back.

Still a further object is to provide a structure of the stated character which requires a relatively shallow vertical space between the seat and vehicle floor and thereby permits extraordinarily low seat height.

Yet a further object is to provide a device of the stated character wherein multiplied linear actuation of the seat is accomplished by a longitudinally extending differential drive mechanism operatively associated with the seat and seat back.

A still further object is to provide a seat of the type referred to including mechanism effective to longitudinally position the entire seat in a plurality of fixed positions of adjustment.

These and other objects and features of the invention will become more fully apparent as reference is had to the accompanying specification and drawings wherein:

Fig. 1 is a perspective view of a seat embodying the invention, illustrating the arrangement of the various parts when the seat is in the normal occupied position.

Fig. 2 is a view similar to Fig. 1 illustrating the relationship of the parts when the seat back has been tilted forwardly to an intermediate position.

Fig. 3 is a fragmentary enlarged side elevational view, partly in section, showing the details of the linear actuating mechanism.

Fig. 4 is an enlarged sectional front elevational view looking in the direction of arrows 4—4 of Fig. 3.

Figure 5:
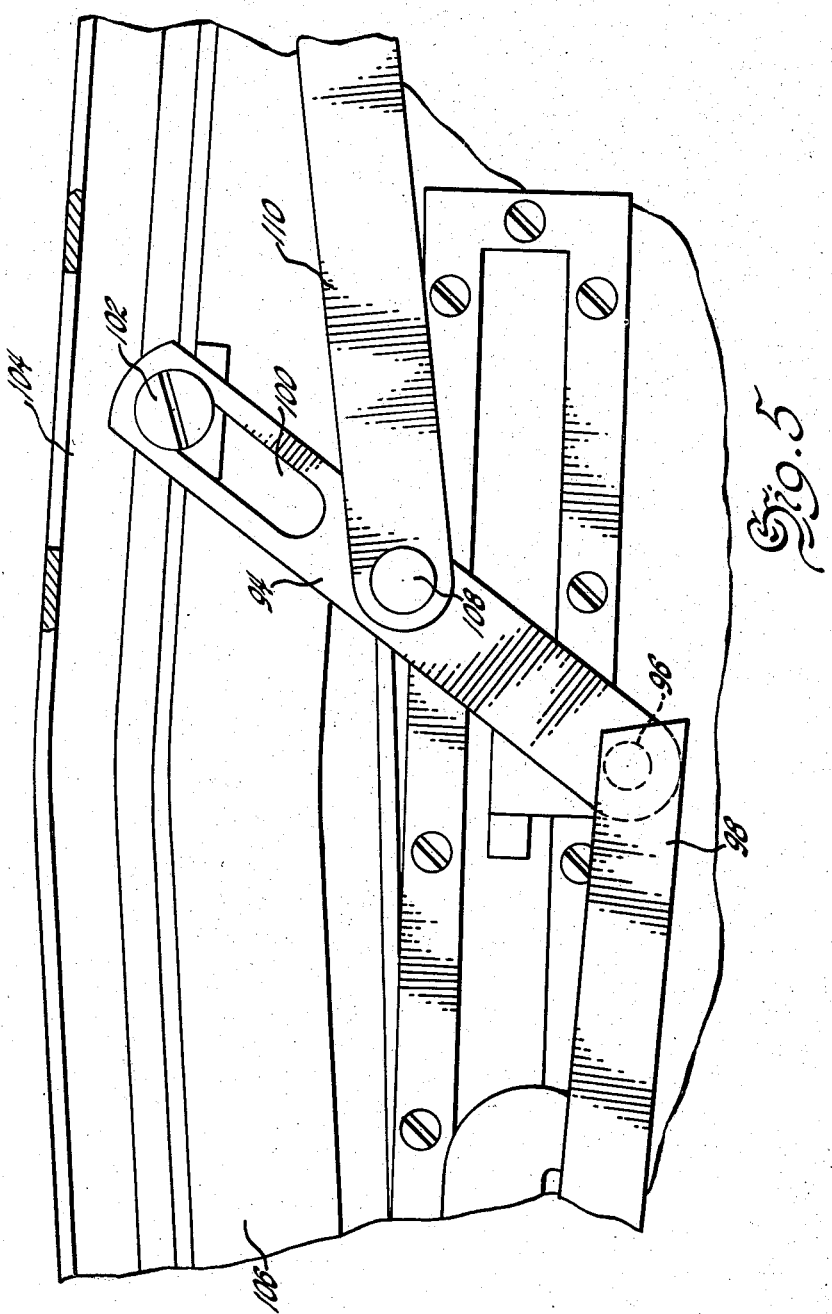
Fig. 5 is an enlarged fragmentary side elevational view of a modified form of the linear actuating mechanism shown in Fig. 3.

Referring now to the drawings and particularly Figs. 1 and 2, there is illustrated a front vehicle seat 2 of the type intended to be occupied by the vehicle operator. It will be understood that a similar seat may be positioned in side by side relation therewith for occupancy by a vehicle passenger. In such instances, the passenger seat will be identical excepting that the various parts will be reversed from right to left. Vehicle seat 2 includes a seat cushion 4 which is mounted in the conventional manner on a seat frame 6. Seat frame 6, in turn, is mounted for longitudinal movement on laterally spaced apart channel type adjuster rails 8. In the preferred construction, spaced adjuster rails 8 are mounted on a swivel base 10 which permits the entire seat to be rotated on a vertical axis. Base 10 may be provided with various forms of latching mechanism for holding the same against rotation when the seat is occupied. For a detailed description of such a device, reference may be had to the copending application, Serial No. 404,847, now Patent No. 2,809,690, by Frederick C. Walther et al., entitled Pivoted Seat, filed January 19, 1954.

As seen in Fig. 4, each of adjuster rails 8 include a lower channel member 12 of V-shaped cross section and a cooperating upper channel 14 of generally C-shaped cross section which is maintained in slidable engagement with member 12 by means of spaced balls 16 and rollers 18. Each channel member 12 is rigidly secured to the pivotal seat base 10 while each channel member 14 is rigidly secured to seat frame 6. Consequently, seat 4 and associated seat frame 6 are longitudinally movable in a conventional manner along a path defined by the channel structures 8.

Disposed in generally vertically extending position at the rear edge of seat 2 is a tiltable seat back 20. Seat back 20 is provided with laterally spaced side frame members 22 and 24 which are formed with forwardly extending portions 26 and 28. Adjacent their forward ends, portions 26 and 28 engage pivot studs 30 which are connected rigidly at the lateral opposite sides of seat frame 6 in transverse alignment. Integral with and extending forwardly and downwardly from the forward portion of arm 28 is a relatively short projection or lever 32. Since seat back 20 and lever 32 extend in generally opposite directions from pivot 30, it will be apparent that projection 32 will swing rearwardly about pivot 30 as seat back 20 is tilted forwardly. It will also be seen that the angular distance traveled by lever 32 during full forward tilting movement of the seat back 20 will be relatively short due to the small radius described about the axis of pivot 30.

In order to provide forward and rearward linear actuation of seat frame 6 substantially greater than the angular range of movement of projection 32, there is provided a differential linkage mechanism which in the preferred embodiment is effective to produce approximately five and one-half inches of linear movement of the seat frame 6 while projection 32 moves through an arc which has a chord measuring approximately two and three quarters inches. As seen in Figs. 1 and 2, a longitudinally extending bracket 34 of generally T-shaped cross section is rigidly secured to one side of seat frame 6. As shown in Fig. 4, bracket 34 is formed with a rectangular vertically extending wall 36. At its upper and lower edges, respectively, wall 36 is provided with integral longitudinally extending channel portions 38 and 40. Channel portion 40 is relatively narrow and is adapted to slidably receive the lower edge 42 of a slide plate 44. Channel portion 38 is substantially wider than channel 40 and has rigidly secured therein a longitudinally extending rack member 46 having rack teeth 48 formed thereon along the lower edge thereof. The inner edge 50 of rack 46 is spaced outwardly from wall 36 to provide a longitudinal groove for receiving the upper edge of plate 44. Connected to the forward lower portion of plate 44 is a second relatively short longitudinally extending rack member 52, having rack teeth 54 formed along the upper edge thereof. Teeth 54 are identical with teeth 48 of rack 46 and are vertically aligned therewith. Pivotally secured to the side wall 56 of rack 52 by a transverse stud 58 is a spring biased swingable latch element 60, the lower rearward end 62 of which is adapted to engage one of a plurality of longitudinally spaced notches 64 formed in a bracket 66. Bracket 66, in turn, is rigidly secured to the seat base 10. Thus, slidable plate 44 and rack 52 may be rigidly locked in a plurality of longitudinal positions relative to bracket 34, the purpose of which will be described shortly. Disposed between the rack teeth 48 and 54 of racks 46 and 52, and intermeshing therewith is a gear element 70. Centrally thereof, gear 70 is pivotally connected by a stud 72 to the forward end 74 of a rearwardly extending link 76. At its rearward end 78, link 76 is, in turn, pivotally connected by a stud 80 to the terminal extremity of projection 32 of seat back arm 24. When seat back 20 is in the normal vertically extending seat occupied position shown in Fig. 1, gear 70 is restrained against bodily fore and aft movement and is, therefore, effective to prevent relative longitudinal movement between racks 46 and 52, since separate longitudinal movement of either rack requires both bodily and angular movement of the gear. Since rack 46 is rigid with respect to seat frame 6, it will be seen that slidable adjustment of rack 52 to the various longitudinal positions defined by slots 64 will cause gear 70 and rack 46 to move therewith, thereby effecting longitudinal repositioning of the entire seat with respect to seat base 10.

In order to facilitate manual adjustment of the seat to the particular longitudinal position most suitable for the individual operator, the transverse forward edge 82 of seat frame 6 is provided with a finger engageable element 84 having a transversely directed shaft 86 formed with a rearwardly extending arm 88. Members 84 and 86 are rotatably supported in a transversely extending sleeve portion 90 formed on edge 82 and are adapted for limited rotation therein. Crank portion 88 overlies and abuttingly engages the turned up forward edge 92 of latch member 60. Upon upward swinging movement of portion 84, crank 88 swings downwardly and rocks latch member 60 about the pivot 58 to upwardly displace the depending notch engaging portion 62 of latch 60. With latch 60 in the raised position, the entire seat is then bodily slidable on rails 8 to any desired longitudinal position. Upon release of portion 84, the mechanism is again locked by latch 60 in the position defined by the notch 64 nearest latch portion 62.

As pointed out previously, when gear 70 is restrained against bodily movement by link 76, the teeth of the gear intermesh with the teeth 48 and 54 of racks 46 and 52 thereby preventing relative longitudinal movement between the respective racks. However, upon forward tilting movement of seat back 20, projection 32 exerts a rearward pulling force on link 76. Since the forward end of link 76 is pivotally connected to gear 70, rearward movement of link 76 is resisted. Consequently, as continued forward tilting pressure is exerted on seat back 20, forward pressure is exerted on pivot 30 which, in turn, causes bracket 34 and seat frame 6 to move forwardly along stationary guide rails 12. As bracket 34 moves progressively forward, rack 46, connected thereto moves forwardly a corresponding distance. Forward movement of rack 46 imparts forward rotation in a counterclockwise direction to gear 70. Simultaneously, gear 70 progresses forwardly along rack teeth 54 of rack 52 due to counterclockwise rotation imparted by rack teeth 48. Rack 52, of course, remains stationary with respect to seat base 10 due to latch 60. As a result, the instantaneous center of the pivotal connection 72 between link 76 and gear 70 moves progressively forwardly as the seat back 20 is tilted progressively forwardly. Hence, link 76 reacts against a constantly forwardly progressing point of pivotal connection. Because of the forwardly progressing axis of rotation of gear 70, rack 46 moves forwardly a linear distance equal to approximately twice the linear distance traveled by gear 70 along the rack teeth 54 of stationary rack 52. As will be seen by reference to Fig. 3, when the seat back 20 is in the normal position, gear 70 occupies a longitudinal position wherein the teeth thereof mesh with rack teeth 48 and 54 along the vertical line A. Upon forward sliding movement of rack 46, gear 70 progresses forwardly along rack teeth 54 of stationary rack 52 to a location providing meshing engagement along the line B. However, during forward rotation of gear 70 to line B, both rotary and bodily movement are imparted to the gear. Consequently, the extent of forward linear movement of rack 46 is necessarily the sum of the aforementioned bodily and angular movement of gear 70. Therefore, the teeth of rack 46 originally lying along the line A will move forwardly to the line C, or approximately twice the distance between lines A and B. It will be understood that upon rearward tilting movement of seat back 20, the corresponding but reverse differential action takes place which returns the seat 2 to the normal seat occupied position.

In Fig. 5, there is illustrated a modified differential mechanism in which a single pivotal link 94 is substituted for the gear 70. Link 94 is pivotally connected at its lower end by a stud 96 secured to a bracket 98 which corresponds to the adjustable stationary rack 52 in the embodiment shown in Fig. 1. At its upper end, link 94 is formed with an elongated slot 100 which, in turn, engages a stud 102 secured rigidly on seat frame 104. Seat frame 104 is rigidly connected to laterally spaced longitudinal adjuster rails 106 to permit longitudinal movement thereof with respect to bracket 98.

Formed intermediately on link 94 is a pivot stud 108 which engages the forward end of a rearwardly extending link 110. At its rearward end, not shown, link 110 is connected to the downwardly projecting portion 32 of seat back arm 24 in the same manner as shown with respect to link 74, of the preferred embodiment. Other structure and arrangement of the seat used in conjunction with the modified form of the invention may be identical to that shown in Figs. 1 and 2.

The mode of operation of the modified form shown in Fig. 5 is as follows. Forward tilting movement of seat back 20 is initially restrained by the pivotal connection 108 between links 94 and 110. Consequently, continued forward pressure on seat back 20 requires that seat frame 104 move forwardly to permit continued rearward swinging movement of projection 32. As frame 104 moves forwardly, the pivot stud 102 carried thereon causes link 94 to swing in a forward arcuate path about the axis of pivotal connection 96. Since forward swinging movement of link 94 imparts forward swinging movement to pivot stud 108, the instantaneous center of the pivotal connection at the forward end of link 110 moves progressively forward as the seat back 20 is tilted progressively forward. In consequence, the link 110 moves progressively forward and in effect provides a constantly forwardly progressing stop resisting rearward angular movement of projection 32. Therefore, the seat frame 104 will move forwardly a relatively great distance as a result of relatively slight rearward angular movement of projection 32 about the axis of stud 30. It should also be noted that by a slight change in the fixed position of stud 108, a wide variation in proportion of horizontal movement of frame 104 to angular movement of projection 32 may be obtained. Thus, for example, as the fixed position of pivot stud 108 is moved progressively upwardly from the intermediate position on link 94, progressively greater linear movement of frame 104 may be obtained without any increase in angular movement of projection 32 and seat back 20.

From the foregoing it will be seen that a novel seat actuator mechanism has been provided. It is to be particularly noted that in the present invention an extreme range of longitudinal movement of the seat may be obtained as a result of limited forward tilting movement of the seat back. Although the vehicle steering wheel normally interferes with the forward tilting path of movement of the seat back on the driver's side, it will be apparent that with the present invention there need be no sacrifice in forward linear movement of the seat due to the required reduction in forward tilting movement of the seat back. In addition, the modified form shown in Fig. 5 is susceptible to considerable variation which allows equal linear displacement of both the driver and passenger seat yet permits the respective seat backs to tilt forwardly through dissimilar ranges of angular movement.

While but two embodiments of the invention have been shown and described, it will be apparent that numerous changes and modifications may be made therein. It is, therefore, to be understood that it is not intended to limit the invention to the embodiments shown but only by the scope of the claims which follow.

We claim:

1. In a vehicle seat, the combination of a seat base, a seat member, means mounting said seat member on said base for linear slidable movement relative thereto, a seat back having depending arm portions, pivot means on said seat member engaging said arms whereby said back may be tilted forwardly over said seat member, a depending projection formed integrally on one of said arms, a link connected to the free end of said projection and extending horizontally forwardly therefrom, and differential means connected to the forward end of said link, said differential means being arranged to react between said seat member and said base whereby tilting movement of said back actuates said seat member linearly relative to said base.

2. In a vehicle seat, the combination of a seat base, a seat member, means mounting said seat member on said base for linear slidable movement relative thereto, a seat back having depending arm portions, transversely aligned pivot means on said seat member engaging said arms whereby said back may be tilted forwardly over said seat member, a depending projection formed integrally on one of said arms, a link connected to the free end of said projection and extending horizontally forwardly therefrom, and differential means connected to the forward end of said link, said differential means being arranged to react between said seat member and said base whereby tilting movement of said back actuates said seat member linearly relative to said base.

3. In a vehicle, the combination of a seat base mounted on the floor of said vehicle, a seat member, means mounting said seat member on said base for linear slidable movement relative thereto, a seat back having depending arm portions, pivot means on said seat member engaging said arms whereby said back may be tilted forwardly over said seat member, a depending projection formed integrally on one of said arms, a link connected to the free end of said projection and extending horizontally forwardly therefrom, and differential means connected to the forward end of said link, said differential means being arranged to react between said seat member and said base whereby said seat member is actuated linearly a distance approximately twice the length of the angular path described by the free end of said projection about the pivotal axis of said pivot means.

4. In a vehicle, the combination of a seat base mounted on the floor of said vehicle, a seat member, means mounting said seat member on said base for linear slidable movement relative thereto, a seat back having depending arm portions, pivot means on said seat member engaging said arms whereby said back may be tilted forwardly over said seat member, a depending projection formed integrally on one of said arms, a link connected to the free end of said projection and extending horizontally forwardly therefrom, and differential linkage means connected to the forward end of said link, said differential means being arranged to react between said seat member and said base whereby said seat member is actuated linearly a distance approximately twice the length of the angular path described by the free end of said projection about the pivotal axis of said pivot means.

5. In a vehicle, the combination of a seat base mounted on the floor of said vehicle, a seat member, means mounting said seat member on said base for linear slidable movement relative thereto, a seat back having depending arm portions, pivot means on said seat member engaging said arms whereby said back may be tilted forwardly over said seat member, a depending projection formed integrally on one of said arms, a link connected to the free end of said projection and extending horizontally forwardly therefrom, and differential gear means connected to the forward end of said link, said differential means being arranged to react between said seat member and said base whereby said seat member is actuated linearly a distance approximately twice the length of the angular path described by the free end of said projection about the pivotal axis of said one of said arms.

6. In a vehicle, the combination of a seat base mounted on the floor of said vehicle, a seat member, means mounting said seat member on said base for linear slidable movement relative thereto, a seat back having depending arm portions, pivot means on said seat member engaging said arms whereby said back may be tilted forwardly over said seat member, a depending projection formed integrally on one of said arms, a link connected to the free end of said projection and extending horizontally forwardly therefrom, and differential gear means connected to the forward end of said link, said differential means being arranged to react between said seat member and said base whereby said seat member is actuated linearly a distance approximately twice the length of the angular path described by the free end of said projection about the pivotal axis of said one of said arms when said back is tilted through its maximum range of movement in either direction.

7. In a device of the class described, a differential linkage mechanism comprising a pair of members connected for relative longitudinal movement, means for maintaining one of said members in a fixed position, a reaction element operatively connecting said members, a link connected at one end to said reaction element, and a lever pivotally connected to one of said members, said lever having one end pivotally connected to the opposite end of said link, whereby upon swinging movement of said lever the connection between said reaction element and said link is caused to move forwardly a predetermined distance relative to one of said members and the other of said members is caused to move forwardly approximately twice said predetermined distance relative to the connection between said reaction element and said link.

8. In a seat construction including a supporting member, a cushion structure, means slidably mounting said cushion structure on said supporting member, and a back portion connected to said cushion structure for tilting movement relative thereto, means for slidably displacing said cushion structure responsive to tilting of said back portion, said means comprising a longitudinally extending bracket rigidly connected to said cushion structure, a slide member movable relative to said bracket and locked in fixed relation with said supportnig member, a link pivotally connected at one end to said slide, lost motion means connecting the opposite end of said link to said bracket, a second link connected at one end to the midportion of said first mentioned link, means forming a relatively short lever on said back portion, and means connecting the opposite end of said last mentioned link to said lever, said first and second links being operative to increase the effective lever ratio of said lever thereby providing greatly increased slidable displacement of said seat in relation to the angular range of movement of said lever.

9. In a seat construction including a supporting member, a cushion structure, means slidably mounting said cushion structure on said supporting member, and a back portion connected to said cushion structure for tilting movement relative thereto, means for slidably displacing said cushion structure and said back portion responsive to tilting of said back portion, said means comprising a longitudinally extending bracket rigidly connected to said cushion structure, a slide member carried by said bracket, means for locking said member in a plurality of fixed positions relative to said supporting member, a link pivotally connected at one end to said slide, lost motion means connecting the opposite end of said link to said bracket, a second link connected at one end to the midportion of said first mentioned link, means forming a relatively short lever on said back portion, and means connecting the opposite end of said last mentioned link to said lever, said first and second links being operative to increase the effective lever ratio of said lever thereby providing greatly increased slidable displacement of said seat in relation to the angular range of movement of said lever.

10. In a seat construction including a supporting member, a cushion structure, means slidably mounting said cushion structure on said supporting member, and a back portion connected to said cushion structure for tilting movement relative thereto, means for slidably displacing said cushion structure and said back portion responsive to tilting of said back portion, said means comprising a longitudinally extending bracket rigidly connected to said cushion structure, a slide member carried by said bracket, means for locking said member in a plurality of fixed positions relative to said supporting member, a generally vertically extending link pivotally connected at one end to said slide, lost motion means connecting the opposite end of said link to said bracket, said means comprising an elongated slot in said link and a pivot member extending through said slot and engaging said slide member, a second link connected at one end to the midportion of said first mentioned link, means forming a relatively short lever on said back portion, and means connecting the opposite end of said last mentioned link to said lever, said first and second links being operative to increase the effective lever ratio of said lever thereby providing greatly increased slidable displacement of said seat in relation to the angular range of movement of said lever.

11. In a device of the class described, a differential linkage mechanism comprising a longitudinally movable channel bracket, a plate slidably disposed in said bracket, means for maintaining said plate in one of a plurality of longitudinally fixed positions, opposed racks formed on said channel bracket and plate, a gear disposed between and operatively engaging said racks, a link connected at one end to said gear, and a lever pivotally connected to said bracket, said lever having one end pivotally connected to the opposite end of said link, whereby upon tilting movement of said lever said gear is caused to move forwardly relative to said rack on said plate and said bracket is caused to move forwardly relative to said gear.

12. In a device of the class described, a differential linkage mechanism comprising a longitudinally movable channel bracket, a plate slidably disposed in said bracket, means for maintaining said plate in one of a plurality of longitudinally fixed positions, vertically spaced opposed rack teeth formed on said channel bracket and plate, a gear disposed between and operatively engaging said rack teeth, a rearwardly extending horizontal link pivotally connected at its forward end to said gear, and a depending lever pivotally connected to said bracket, said lever having its free end pivotally connected to the rearward end of said horizontal link, whereby upon forward tilting movement of said lever said gear is caused to move forwardly along said rack teeth on said plate and said rack teeth on said bracket are caused to move forwardly relative to said gear.

13. In a device of the class described, a differential linkage mechanism comprising a pair of members connected for relative longitudinal movement, means for maintaining one of said members in a fixed position, a reaction element operatively connecting said members, a link connected at one end to said reaction element at a point off center relative to the latter, and a lever pivotally connected to one of said members, said lever having one end pivotally connected to the opposite end of said link, whereby upon swinging movement of said lever the connection between said reaction element and said link is caused to move forwardly a predetermined distance relative to one of said members and the other of said members is caused to move forwardly more than twice said predetermined distance relative to the connection between said reaction element and said link.

14. A seat structure comprising, a base member, a seat member, means mounting said seat member on said base member for movement relative thereto, a back member connected to said seat member for tilting movement relative thereto, lever means on said back member, and differential drive means interconnecting said lever means, said seat member, and said base member, to impart movement to said seat member upon tilting movement of said back member relative to said seat member.

15. A seat structure comprising, a base member, a seat member, means mounting said seat member on said base member for longitudinal movement relative thereto, a normally upright back member connected to said seat member adjacent the rear edge thereof for tilting movement relative thereto, lever means on said back member, and differential drive means interconnecting said lever means, said seat member, and said base member, to impart longitudinal movement to said seat member upon tilting movement of said back member relative to said seat member.

16. A seat structure comprising, a base member, a seat member, longitudinal guide means on said base member operatively connected to said seat member for guiding longitudinal movement thereof relative to said base member, a normally upright back member connected to said seat member adjacent the rear edge thereof for tilting movement relative thereto, lever means on said back member, differential drive means interconnecting said lever means, said seat member, and said base member, to impart longitudinal movement to said seat member upon tilting movement of said back member relative to said seat member, and means associated with said differential drive means for retaining said seat member in a predetermined fixed longitudinal position relative to said base member when said back member is in normal position.

17. A seat structure comprising, a base member, a seat member, longitudinal guide means on said base member operatively connected to said seat member for guiding longitudinal movement thereof relative to said base member, a normally upright back member connected to said seat member adjacent the rear edge thereof for tilting movement relative thereto, lever means on said back member, differential drive means interconnecting said lever means, said seat member, and said base member, to impart longitudinal movement to said seat member upon tilting movement of said back member relative to said seat member, and latch means cooperating with said differential drive means for retaining said seat member in one of a plurality of predetermined fixed longitudinal positions when said back member is in normal position.

18. A seat structure comprising, a fixed seat base, a seat member, means mounting said seat member on said base for fore and aft sliding movement relative thereto, a back member having depending arms connected to said seat member for tilting movement of said back member relative thereto, lever means on at least one of said depending arms, differential linkage means interposed between said seat member and said base, and means interconnecting said differential linkage means and said lever means whereby tilting movement of said back member relative to said seat member imparts fore and aft movement to said seat member.

19. A seat structure comprising, a fixed seat base, a seat member, means mounting said seat member on said base for fore and aft sliding movement relative thereto, a normally upright back member having depending arms connected to said seat member for tilting movement of said back member relative thereto, integral lever means on at least one of said arms, differential linkage means interposed between said seat member and said base, and means interconnecting said differential linkage means and said lever means whereby forward tilting movement of said back member relative to said seat member imparts forward movement to said seat member and return of said back member to normal upright position imparts rearward movement to said seat member.

References Cited in the file of this patent

UNITED STATES PATENTS

| 178,016 | McDonough | May 30, 1876 |
| 1,512,647 | Stevens | Oct. 21, 1924 |
| 1,636,078 | Schreiber | July 19, 1927 |
| 2,374,848 | Wohlk | May 1, 1945 |
| 2,730,162 | Davis | Jan. 10, 1956 |
| 2,795,266 | Walther | June 11, 1957 |

FOREIGN PATENTS

| 690,528 | France | Jan. 23, 1930 |